Jan. 13, 1953  D. W. KELBEL  2,625,057
TRANSMISSION
Filed Feb. 25, 1948
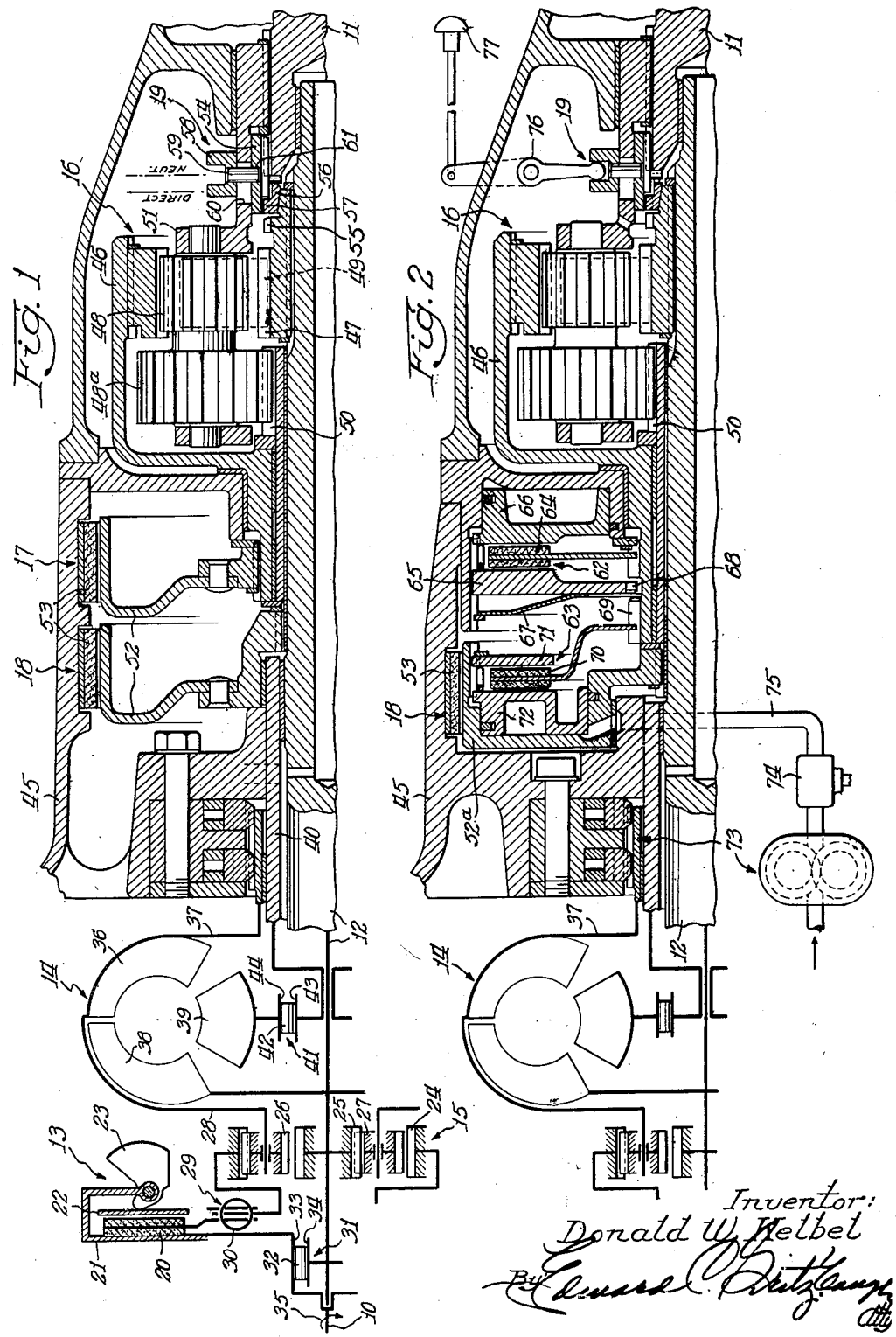
Inventor:
Donald W. Kelbel Patented Jan. 13, 1953

2,625,057

UNITED STATES PATENT OFFICE 2,625,057

TRANSMISSION

Donald W. Kelbel, Muncie, Ind., assignor to Borg-Warner Corporation, Chicago, Ill., a corporation of Illinois Application February 25, 1948, Serial No. 10,730

10 Claims. (Cl. 74—761)

My invention relates to transmissions for automotive vehicles and more particularly to such transmissions including a hydrodynamic coupling device.

It is an object of the present invention to provide an improved gear set for use in connection with a hydrodynamic coupling device, which gear set provides at least two forward speed drives and a reverse drive which are of suitable ratio for use with such a hydrodynamic device.

Transmissions have heretofore been provided which give a drive therethrough upon engagement of a coupling that is actuated by means of fluid pressure, and such fluid pressure is commonly derived from a pump driven by one of the shafts of the transmission. When such shaft is, however, inoperative then it is not possible to engage the coupling to complete the drive and, accordingly, it is not possible to start the engine of the vehicle by pushing or towing the vehicle.

In order to overcome such objections it is an object of the present invention to provide a manually actuated coupling for use in lieu of the fluid pressure actuated coupling for completing a power train through the transmission so that the engine of the vehicle may be actuated by pushing or towing the car in order to start the engine.

It is a more particular object of the invention to provide a friction clutch engaged by fluid pressure for locking together two elements of a planetary gear set in the transmission to provide a direct drive between driving and driven shafts and to provide for use in lieu of such friction clutch a positive type clutch for locking up the gear set to provide a direct drive when the source of fluid pressure for the friction clutch is not operative.

The invention consists of the novel constructions, arrangements and devices to be hereinafter described and claimed for carrying out the above stated objects and such other objects as will appear from a detailed description of preferred embodiments of the invention illustrated with reference to the accompanying drawings wherein:

Fig. 1 is a longitudinal sectional view, partly schematic, of a transmission embodying the principles of the invention; and Fig. 2 is a similar view of a modified form of the invention.

Like characters of reference designate like parts in the several views.

Referring now to Fig. 1 the illustrated transmission comprises a drive shaft 10, a driven shaft 11 and an intermediate shaft 12. The transmission comprises in general a centrifugal clutch 13 driving a hydraulic torque converter 14 by means of planetary speed-up gearing 15. The torque converter drives the driven shaft 11 by means of a planetary gear set 16 which is controlled by brakes 17 and 18 and a clutch 19. The torque converter 14 drives the shaft 12 and this shaft constitutes a drive shaft for the gear set. The transmission is adapted to be installed in an automotive vehicle with the drive shaft 10 being driven by the engine (not shown) of the vehicle and the driven shaft 11 being connected to drive the driving road wheels (not shown) of the vehicle.

The centrifugal clutch 13 is of usual construction and comprises a driven plate 20 adapted to be engaged between a flywheel 21 and a pressure plate 22. Weights 23 rotate along with the flywheel 21 and are effective when they move outwardly to move the pressure plate 22 toward the flywheel 21 to engage the driven plate 20 therebetween.

The planetary gearing 15 comprises a ring gear 24, a sun gear 25, a planet gear 26 in mesh with the ring gear, a planet gear 27 in mesh with both the planet gear 26 and the sun gear 25 and a carrier 28 for the planet gears. The ring gear 24 is connected to the driven clutch plate 20 by means of a vibration dampener 29. The vibration dampener is of a usual construction and comprises springs 30 disposed between opposing parts of the vibration dampener so that vibrations transmitted from the driven clutch disc 20 are absorbed by the springs. The sun gear 25 is fixed to the intermediate shaft 12 as shown.

A one-way clutch 31 is disposed between the shafts 10 and 12 and the clutch comprises rollers 32 disposed between opposing cam surfaces 33 and 34. The cam surfaces are so formed that the rollers 32 do not engage between the surfaces when the shaft 10 is rotating in its forward direction as indicated by the arrow 35 and the intermediate shaft 12 is rotating in the same direction but at a slower speed, but the rollers do engage when the shafts 10 and 12 are both rotating in the forward direction and the shaft 12 tends to rotate at a faster speed than the shaft 10. The roller clutch 31 is for the purpose of providing a drive directly between the shafts 12 and 10 as when the vehicle is being towed or pushed for starting the engine of the vehicle.

The hydraulic torque converter 14 is of a usual construction and comprises a bladed impeller 36 carried by the casing 37 of the torque converter, a bladed runner or driven element 38 and a bladed stator or reaction element 39. The casing 37 is connected to the planet carrier 28; the runner 38 is connected to the intermediate shaft 12 and the stator 39 is rotatably disposed on a sleeve-like shaft 40. The casing 37 is filled at least partially with liquid, the casing acting as a container for the liquid, and when the impeller 36 is rotated the runner 38 is thereby driven through the liquid. The reaction element 39 when stationary functions to multiply the torque transmitted through the torque converter 14 so that the torque impressed on the runner 38 is greater than that impressed on the impeller 36. The stator 39 during such torque conversion has reaction forces thereon in the reverse direction, that is, in a direction opposite to that indicated by the arrow 35, and after the speed of the rotor 38 has increased to a predetermined value, the reaction forces on the stator 39 change so that the stator tends to be rotated in the forward direction, and thereafter the torque converter 14 functions as a simple fluid coupling, with the torque impressed on the rotor 38 being substantially equal to that impressed on the impeller 36.

A one-way brake 41 is provided for preventing reverse rotation of the stator 39 and for allowing its forward rotation. The roller brake comprises rollers 42 disposed between opposite cam surfaces 43 and 44, the cam surfaces 44 being carried by the stator 39 and the cam surfaces 43 being formed on the shaft 40. The shaft 40 is anchored by any suitable means to the casing 45 of the transmission.

The arrangement of the planetary gear set 15, the centrifugal clutch 13 and the hydraulic torque converter 14 is very similar to and operates similarly to the same arrangement shown in Schneider Patent No. 2,333,681, and the arrangement will, therefore, not be further described in detail. As a rotation is given the shaft 10, the weights 23 of the centrifugal clutch 13 move outwardly and the ring gear 24 of the gear set 15 is driven. This rotation of the ring gear causes a rotation of the converter casing 37 and the impeller 36 at an increased speed, due to the action of the gear set 15, whereby the rotor 38 is driven. The drive through the converter is with increased torque on the rotor, due to the action of the stator 39. When the speed of the shaft 12 increases sufficiently, the reaction on the stator 39 changes and the converter thereafter functions as a simple fluid coupling. The speeds of the impeller 36 and runner 38 of the torque converter then become nearly equal, and all of the parts of the gear set 15 begin to rotate substantially together so that there is substantially a direct drive between the shafts 10 and 12.

The planetary gear set 16 comprises a ring gear 46, a sun gear 47, a planet gear 48 in mesh with the ring gear and a planet gear 49 in mesh with the planet gear 48 and with the sun gear 47. The planet gear 48 has a gear portion 48a, and this gear portion is in mesh with a second sun gear 50. The planet gears 48 and 49 are rotatably disposed on a gear carrier 51.

The sun gear 47 is splined on the shaft 12 and the gear carrier 51 is connected with the shaft 11. The ring gear 46 is connected with the brake 17 and the sun gear 50 is connected with the brake 18. The brakes 17 and 18 each comprise a drum 52 and a brake band 53 adapted to engage the drum. The brake bands 53 may be actuated by any suitable motors (not shown).

The clutch 19 comprises a shiftable clutch element 54 splined on the shaft 11 and teeth 55 formed on the sun gear 47 with which the shiftable clutch element 54 is adapted to mesh. A synchronizing blocking ring 56 having blocker teeth 57 is disposed between the clutch element 54 and the teeth 55. The synchronizer 56 is of any suitable well known construction and functions to synchronize the sun gear 47 and the teeth 55 with respect to the clutch element 54 when the latter is being moved toward engagement with the teeth 55 and to prevent such engagement until there is such synchronization. The clutch element 54 is shifted by means of a collar 58 slidably disposed on a sleeved extension of the planet gear carrier 51 and connected with the clutch element by means of pins 59 which extend through slots 60 in the sleeve of the carrier 51 and into a groove 61 in the clutch element.

The gear set 16 functions to provide a low forward drive, a direct drive and a reverse drive between the shafts 12 and 11. With the clutch 19 in its disengaged position in which it is shown on the drawing and with both the brake bands 53 disengaged the gear set is in neutral condition and there is no connection between shafts 12 and 11. The brake 18 is engaged to provide the low forward drive between the shafts 12 and 11. Engagement of the brake 18 functions to hold the sun gear 50 against rotation and this sun gear functions thereafter as the reaction member of the gear set. Thereafter, upon rotation of the shaft 12 by the torque converter 14 and the planetary gearing 15, the shaft 11 is driven in low speed forward drive, in which drive the latter shaft 11 rotates at a slower speed than the shaft 12.

Direct drive between the shafts 12 and 11 is provided by disengaging the brake 18 and engaging the clutch 19, by moving the clutch element 54 into engagement with the clutch teeth 55. Such engagement may be made when the speeds of the shafts 12 and 11 are synchronized, as may be done by releasing the accelerator of the vehicle to its closed throttle position, and the shafts 12 and 11 are thereafter directly coupled to rotate together.

The shaft 11 may be driven in the reverse direction by engaging the brake 17 so as to hold the ring gear 46 stationary. The ring gear 46 then acts as the reaction element of the gear set 16, and driving of the shaft 12 and sun gear 47 splined thereon causes reverse rotation of the carrier 51 and thereby of the shaft 11 connected thereto, with the shaft 11 rotating at a slower speed than the shaft 12.

The modification of the invention shown in Fig. 2 is quite similar in many respects to that shown in Fig. 1 and differs only essentially in that a different type brake 62 is provided for the ring gear 46 and a friction clutch 63 is provided for locking together the ring gear 46 and the sun gear 50 for obtaining direct drive between the shafts 12 and 11. The brake 62 includes a friction disc 64 splined to the ring gear 46, a pressure plate 65 splined to the casing 45 of the transmission and a piston 66 for engaging the friction disc 64 between it and the pressure plate 65. The pressure plate 65 is yieldably held against axial movement by a spring washer 67 fixed to the casing 45, and the plate is provided with internal teeth 68 which are adapted to engage with splines 69 formed on the ring gear 46. The piston 66 is adapted to have fluid under pressure applied behind it for engaging the friction disc 64 between the piston and the pressure plate 65. The pressure plate 65 moves axially upon such engagement of the friction disc 64 so that its teeth 68 ultimately engage the teeth 69 for thereby locking the ring gear 46 to the casing 45 through the pressure plate.

The brake 18 comprises a brake band 53 acting on a drum 52a and is quite similar to the brake 18 hereinbefore described with respect to the first embodiment. The clutch 63 comprises a friction disc 70 splined to the ring gear 46. The drum 52a carries a pressure plate 71 and a piston 72 between which the friction disc is disposed. The piston 72 is adapted to have fluid under pressure applied thereto for engaging the friction disc 70 between it and the pressure plate 71 for thereby applying the friction clutch 63. The fluid pressure for engaging the clutch 63 may be derived from a pump 73 driven by the housing 37 of the torque converter 14, and a valve 74 of any suitable construction may be disposed in a fluid line 75 between the pump and piston 72 for controlling application of fluid pressure to the piston 72. The clutch 19 in this form of the invention is adapted to be manually actuated by means of any suitable manual linkage 76 and a button 77 on the dash board of the automotive vehicle in which the transmission is installed. It will be understood that the piston 66 may be operated similarly to the piston 72 from the pump 73 to engage the friction brake 62, and suitable servomotor means (not shown) could also be supplied for the brake 18.

Low speed forward and reverse drives are obtained in the second embodiment of the invention in substantially the same manner as in the first embodiment by engaging the brake 18 or the brake 62. The action of the brake 62 is noteworthy in that this is a combination friction and positive brake. The friction disc 64 is initially engaged between the pressure plate 65 and piston 66 for preliminarily stopping rotation of the ring gear 46 to complete the reverse drive power train, and after such initial engagement of the brake, the pressure plate 65 is moved by the piston 66 to engage its teeth 68 with the teeth 69 to thereby positively connect the ring gear 46 and casing 45. The ring gear 46 is thus braked with a brake having relatively small friction engaging surfaces considering the high torque which is put on the ring gear for reverse drive.

High speed forward drive is preferably obtained by engaging the friction clutch 63 instead of the positive clutch 19. The clutch 63 when engaged locks together the ring gear 46 and the sun gear 50 and thereby the gear set 16 as a whole to provide a direct drive between the shafts 12 and 11. Since the clutch 63 is of the friction type, the transmission may be power shifted from low speed forward drive to high speed forward drive, that is, the shift may be made without first synchronizing the speeds of the shafts 12 and 11. The positive clutch 19 is, nevertheless, preferably still provided so that the shafts 12 and 11 may be directly connected in order that the shaft 12 and thereby the drive shaft 10 may be driven by pushing or towing the vehicle even though there is no fluid pressure available for engaging the fluid pressure engaged friction clutch 63 or the brakes of the transmission which may both be fluid pressure engaged. As will be understood, no fluid pressure is available from the pump 73 for either the piston 72 or other fluid pressure actuated power train completing mechanisms in the transmission when the drive shaft 10 is inoperative, and the manually actuated clutch 19 provides a means for completing a power train through the transmission nevertheless. As has been described, when a power train for pushing or towing the vehicle is completed through the gear set 16, the shaft 12 drives the shaft 10 exclusive of the torque converter 14 and through the one-way clutch 31.

The gear set 16, which I have provided in tandem with the torque converter 14, advantageously provides ratios suitable for use with such a fluid converter in order to drive a vehicle satisfactorily. In the second embodiment the positive cluch 19 advantageously allows a completion of the power train between the shafts 12 and 11 so that the vehicle may be towed or pushed in order to energize the driving engine of the vehicle, even though the coupling mechanism energized by fluid pressure provided by rotation of the drive shaft of the vehicle is not available.

I wish it to be understood that my invention is not to be limited to the specific constructions shown and described except only insofar as the claims are so limited as it will be understood that changes will be made without departing from the principles of the invention. In construing the claims, in particular I wish it to be understood that where I specify a coupling I mean to include by such terminology not only a clutch for coupling together two movable elements but also a brake for coupling together a movable element and a stationary element.

I claim:

1. In a transmission, the combination of a drive shaft, a driven shaft, a planetary gear set, said gear set comprising a ring gear, a sun gear, a planet gear in mesh with said ring gear, a planet gear in mesh with said first planet gear and with said sun gear, said first-named planet gear having a gear portion of a different number of teeth than the planet gear and not in mesh with said second-named planet gear, a sun gear in mesh with said gear portion, and a carrier for said planet gears, said planet carrier being connected to said driven shaft and said first-named sun gear being connected with said drive shaft, a two-way friction brake for two-way braking of said second-named sun gear for providing a low forward geared ratio between said shafts, a friction brake for said ring gear for providing a reverse geared drive between said shafts, and a positive type clutch carried by said driven shaft and engageable with said first-named sun gear for locking together directly said drive and driven shafts.

2. In a transmission, the combination of a drive shaft, a driven shaft, a planetary gear set comprising a plurality of driving and drive receiving elements, one of the elements of said gear set being connected with said drive shaft and another of said elements being connected with said driven shaft, a clutch for locking together two of said elements of said gear set for completing a drive between said shafts, said clutch being adapted to be engaged by fluid pressure, a source of fluid pressure adapted to be connected with said clutch, and a second clutch for connecting together two of said elements of said gear set and adapted to be manually operated for use in lieu of said first-named clutch when said source of fluid pressure is inoperative.

3. In a transmission, the combination of a drive shaft, a driven shaft, a planetary gear set comprising a plurality of driving and drive receiving elements, one of said elements of said gear set being connected with said drive shaft and another of said elements being connected with said driven shaft, a friction clutch for connecting together two of said elements of said gear set to provide a direct drive between said shafts, a fluid pressure actuated piston for engaging said friction clutch, a source of fluid pressure adapted to be connected with said piston for engaging said clutch and comprising a pump driven with said drive shaft, and a positive clutch for connecting directly said drive and driven shafts to provide a direct drive between said shafts in lieu of the drive provided by said friction clutch when said drive shaft is inoperative.

4. In a transmission, the combination of a drive shaft, a driven shaft, a planetary gear set, said gear set comprising a ring gear, a sun gear, a planet gear in mesh with said ring gear, a planet gear in mesh with said first-named planet gear and with said sun gear, said first-named planet gear having a gear portion not in mesh with said second-named planet gear and of a different number of teeth than said first-named planet gear, a sun gear in mesh with said gear portion, and a carrier for said planet gears, said first-named sun gear being connected with said drive shaft and said carrier being connected with said driven shaft, a friction clutch for locking together said ring gear and said second-named sun gear, a fluid pressure actuated piston for engaging said friction clutch, a source of fluid pressure adapted to be connected with said piston for engaging said clutch, said fluid pressure source including a pump driven along with said drive shaft, and a manually operated positive clutch for connecting directly said drive and driven shafts for providing a drive between said shafts in lieu of that provided by said friction clutch when said drive shaft is stationary and said pump is inoperative.

5. In a transmission having a drive shaft and a driven shaft, means for completing a power train between said shafts and including a combination friction and positive brake for braking a rotatable part of the transmission with respect to the transmission case, said brake comprising a friction disc splined to said rotatable part and a pair of pressure plates splined to said case and disposed on opposite sides of said friction disc and adapted to engage the disc between them, and positive teeth on one of said pressure members and on said rotatable part adapted to engage after said rotatable part has been brought to rest by said pressure plates acting on said friction disc.

6. In a coupling for coupling together two relatively rotatable parts, the combination of a friction disc splined on to one of said parts, a pressure plate and a piston splined on to the other of said parts and having said friction disc disposed between them, a spring acting on said pressure plate, and positive clutch teeth provided on said first named part and on said pressure plate, said piston being adapted to initially engage said friction disc between it and said pressure plate and thereafter to move the friction disc and pressure plate against the action of said spring to engage said positive clutch teeth for positively locking said relatively rotatable parts together.

7. In a transmission, the combination of a drive shaft, a driven shaft, a planetary gear set, said gear set comprising a ring gear, a sun gear, a planet gear in mesh with said ring gear, a planet gear in mesh with said first planet gear and with said sun gear, said first-named planet gear having a gear portion of a different number of teeth than the planet gear and not in mesh with said second-named planet gear, a sun gear in mesh with said gear portion, and a carrier for said planet gears, said planet carrier being connected with said driven shaft and said first-named sun gear being connected wtih said drive shaft, a two-way friction brake for two-way braking of said second-named sun gear for providing a low forward geared ratio between said shafts, a friction brake for said ring gear for providing a reverse geared drive between said shafts, a positive type clutch carried by said driven shaft and engageable with said first-named sun gear for locking together directly said drive and driven shafts, and means associated with the positive type clutch for synchronizing the clutch with the sun gear prior to effecting positive engagement.

8. In a brake, in combination, a rotatable part, a friction disc splined on to said rotatable part, a rotationally stationary pressure plate on one side of said disc and a piston on the other side of said disc, a return spring acting on said pressure plate and adapted to allow movement of the presure plate, and meshable teeth on said pressure plate and on said rotatable part, said piston being adapted to frictionally engage said disc between it and said pressure plate on movement of the piston and subsequently move said pressure plate against the action of said spring to engage the teeth on the plate with said teeth on said rotatable part for completing a positive braking engagement between the rotatable part and the pressure plate.

9. In a transmission, the combination of a drive shaft, a driven shaft, a planetary gear set for connecting said shafts, said planetary gear set comprising a sun gear, a ring gear, a pair of planet gears each in mesh with the other and one being in mesh with the ring gear and the other being in mesh with the sun gear, a planet gear portion connected with one of said planet gears, a sun gear in mesh with said last-named gear portion, and a carrier for said planet gears, said carrier being connected with one of said shafts and said first-named sun gear being connected with the other of said shafts, a brake for said ring gear for completing a reverse drive power train between said shafts, a brake for said second-named sun gear for completing a forward drive power train between said shafts, and a clutch for connecting together said carrier and said first-named sun gear for locking up said gear set for a 1–1 drive between said shafts.

10. In a transmission, the combination of a drive shaft, a driven shaft, means defining a first power train between said shafts including planetary gearing, a friction clutch for completing a one to one ratio drive through said power train, a source of fluid pressure, a fluid pressure operated piston for engaging said clutch and adapted to be connected with said fluid pressure source, and means defining a second power train between said shafts of the same ratio as said first power train including a two-way positive type clutch completely independent of said first means and comprising a shiftable clutch engaging element adapted to be manually engaged for completing said second power train in lieu of said first power train when said source of fluid pressure is inoperative as well as when said source of fluid pressure is operative.

DONALD W. KELBEL.

(References on following page)

REFERENCES CITED

The following references are of record in the file of this patent:

UNITED STATES PATENTS

| Number | Name | Date |
|---|---|---|
| 879,086 | Coffee | Feb. 11, 1908 |
| 980,407 | Clarke | Jan. 3, 1911 |
| 1,448,095 | Steele | Mar. 13, 1923 |
| 1,659,525 | Gaylord | Feb. 14, 1928 |
| 1,681,714 | Tullar | Aug. 21, 1928 |
| 1,863,110 | Salerni | June 14, 1932 |
| 1,998,172 | Ross | Apr. 16, 1935 |
| 2,029,118 | Patterson | Jan. 28, 1936 |
| 2,091,449 | Littell | Aug. 31, 1937 |
| 2,144,256 | Duffield | Jan. 17, 1939 |
| 2,152,552 | Lindstrom | Mar. 28, 1939 |
| 2,193,305 | Thompson | Mar. 12, 1940 |
| 2,196,660 | Dodge | Apr. 9, 1940 |
| 2,259,437 | Dean | Oct. 21, 1941 |
| 2,292,633 | Griswold | Aug. 11, 1942 |
| 2,308,547 | Schneider | Jan. 19, 1943 |
| 2,319,784 | Backus | May 25, 1943 |
| 2,351,213 | James | June 13, 1944 |
| 2,374,303 | Osborne | Apr. 24, 1945 |
| 2,378,085 | Jandasek | June 12, 1945 |
| 2,395,459 | Carnagua | Feb. 26, 1946 |
| 2,397,634 | Voytech | Apr. 2, 1946 |
| 2,402,164 | Kelbel | June 18, 1946 |
| 2,406,225 | Kelber | Aug. 20, 1946 |
| 2,449,586 | Carnagua | Sept. 21, 1946 |
| 2,460,956 | Trail | Feb. 8, 1949 |
| 2,462,944 | Cardwell | Mar. 1, 1949 |
| 2,559,128 | McFarland | July 3, 1951 |

FOREIGN PATENTS

| Number | Country | Date |
|---|---|---|
| 141,492 | Great Britain | Apr. 22, 1920 |
| 337,242 | Great Britain | Oct. 30, 1930 |